US010728142B2

(12) United States Patent
Hill et al.

(10) Patent No.: US 10,728,142 B2
(45) Date of Patent: *Jul. 28, 2020

(54) NETWORK SERVICES ACROSS NON-CONTIGUOUS SUBNETS OF A LABEL SWITCHED NETWORK SEPARATED BY A NON-LABEL SWITCHED NETWORK

(71) Applicant: Cisco Technology, Inc., San Jose, CA (US)

(72) Inventors: Craig Thomas Hill, Sterling, VA (US); James Guichard, New Boston, NH (US); Darrin Joseph Miller, Marysville, OH (US); Carlos M. Pignataro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,464

(22) Filed: Nov. 29, 2018

(65) Prior Publication Data

US 2019/0097924 A1    Mar. 28, 2019

Related U.S. Application Data

(63) Continuation of application No. 15/249,260, filed on Aug. 26, 2016, now Pat. No. 10,158,565.

(51) Int. Cl.
*H04L 12/723* (2013.01)
*H04L 12/725* (2013.01)
(Continued)

(52) U.S. Cl.
CPC ............ *H04L 45/50* (2013.01); *H04L 45/306* (2013.01); *H04L 45/34* (2013.01); *H04L 45/38* (2013.01);
(Continued)

(58) Field of Classification Search
None
See application file for complete search history.

(56) References Cited

U.S. PATENT DOCUMENTS 7,382,787 B1 * 6/2008 Barnes ................... H04L 69/22
370/401
9,038,151 B1 * 5/2015 Chua ..................... H04L 45/02
726/6
(Continued)

FOREIGN PATENT DOCUMENTS

EP     1134938 A1    9/2001
EP     1478129 A2   11/2004
(Continued)

OTHER PUBLICATIONS

Quinn et al, "Network Service Header." Jan. 22, 2015. < https://www.ietf.org/archive/id/draft-quinn-sfc-nsh-05.txt>, 2015.*
(Continued)

*Primary Examiner* — Andrew C Oh
(74) *Attorney, Agent, or Firm* — Johnson, Marcou, Isaacs & Nix, LLC

(57) ABSTRACT

In a first enclave of a label switching network (LSN), a protocol data unit (PDU) of the LSN is formatted to include a network service field specifying a service to be applied to the PDU. The service field can be positioned between PDU data link layer and network layer fields. The PDU specifies PDU routing/forwarding information for a path in the LSN ending in an LSN second enclave, and routing/forwarding for a destination between path segments in a non-LSN. The PDU is communicated from the first enclave, via the non-LSN, to the second enclave in accordance with the routing/forwarding information for the destination between path segments in the non-LSN. In the second enclave, each network service specified for the PDU is determined and then applied to the PDU. The second enclave transmits the (Continued)

network serviced PDU from the second enclave in accordance with the routing/forwarding information of the PDU in the label switching network.

20 Claims, 7 Drawing Sheets

(51) Int. Cl.
    *H04L 12/721*     (2013.01)
    *H04L 12/715*     (2013.01)
    *H04L 29/08*     (2006.01)
    *H04L 12/911*     (2013.01)
    *H04L 29/06*     (2006.01)

(52) U.S. Cl.
    CPC ............ *H04L 45/566* (2013.01); *H04L 45/64* (2013.01); *H04L 47/825* (2013.01); *H04L 67/327* (2013.01); *H04L 69/321* (2013.01); *H04L 69/22* (2013.01)

(56) References Cited

U.S. PATENT DOCUMENTS

| | | | |
|---|---|---|---|
| 9,634,936 B2* | 4/2017 | Bansal | H04L 45/306 |
| 9,686,181 B2* | 6/2017 | Akiya | H04L 45/28 |
| 9,749,229 B2* | 8/2017 | Previdi | H04L 45/306 |
| 9,787,559 B1* | 10/2017 | Schroeder | H04L 41/5038 |
| 9,806,962 B2* | 10/2017 | Guichard | H04L 45/302 |
| 9,825,777 B2* | 11/2017 | Shen | H04L 12/4675 |
| 9,825,856 B2* | 11/2017 | Yong | H04L 45/74 |
| 9,860,790 B2* | 1/2018 | Khan | H04W 40/00 |
| 10,164,875 B2* | 12/2018 | Guichard | H04L 45/50 |
| 2002/0131408 A1* | 9/2002 | Hsu | H04J 3/1611 370/355 |
| 2005/0013295 A1* | 1/2005 | Regan | H04L 12/4641 370/389 |
| 2010/0254385 A1* | 10/2010 | Sharma | H04L 12/4633 370/392 |
| 2011/0110370 A1* | 5/2011 | Moreno | H04L 45/04 370/392 |
| 2012/0281540 A1* | 11/2012 | Khan | H04W 12/1201 370/241 |
| 2014/0105039 A1* | 4/2014 | McDysan | H04L 45/306 370/252 |
| 2014/0105216 A1* | 4/2014 | McDysan | H04L 67/1095 370/400 |
| 2014/0341029 A1* | 11/2014 | Allan | H04L 47/125 370/235 |
| 2014/0351452 A1* | 11/2014 | Bosch | H04L 67/10 709/242 |
| 2014/0362682 A1* | 12/2014 | Guichard | H04L 43/0823 370/221 |
| 2014/0362857 A1* | 12/2014 | Guichard | H04L 45/566 370/392 |
| 2015/0195197 A1* | 7/2015 | Yong | H04L 45/74 370/392 |
| 2015/0200838 A1* | 7/2015 | Nadeau | H04L 45/38 398/58 |
| 2015/0304206 A1* | 10/2015 | Filsfils | H04L 45/46 709/238 |
| 2015/0326473 A1* | 11/2015 | Dunbar | H04L 12/4633 370/392 |
| 2015/0358235 A1* | 12/2015 | Zhang | H04L 45/745 370/230 |
| 2016/0014016 A1* | 1/2016 | Guichard | H04L 45/04 709/226 |
| 2016/0099864 A1* | 4/2016 | Akiya | H04L 45/28 370/216 |
| 2016/0127564 A1* | 5/2016 | Sharma | H04L 12/1407 455/406 |
| 2016/0134481 A1* | 5/2016 | Akiya | H04L 41/5038 709/224 |
| 2016/0139939 A1* | 5/2016 | Bosch | H04W 4/60 718/1 |
| 2016/0337235 A1* | 11/2016 | Guichard | H04L 63/0272 |
| 2016/0337251 A1* | 11/2016 | Venkataramanan | H04L 47/2433 |
| 2016/0352866 A1* | 12/2016 | Gupta | H04L 67/42 |
| 2016/0380823 A1* | 12/2016 | Shen | H04L 12/4675 370/254 |
| 2017/0005920 A1* | 1/2017 | Previdi | H04L 45/306 |
| 2017/0026417 A1* | 1/2017 | Ermagan | H04L 63/029 |
| 2017/0041246 A1* | 2/2017 | Maino | H04L 47/825 |
| 2017/0054692 A1* | 2/2017 | Weis | H04L 63/20 |
| 2017/0054758 A1* | 2/2017 | Maino | H04L 41/5025 |
| 2017/0063783 A1* | 3/2017 | Yong | H04L 67/2814 |
| 2017/0064039 A1* | 3/2017 | Shen | H04L 67/327 |
| 2017/0064717 A1* | 3/2017 | Filsfils | H04L 47/17 |
| 2017/0111209 A1* | 4/2017 | Ward | H04L 41/0631 |
| 2017/0163569 A1* | 6/2017 | Koganti | H04L 49/25 |
| 2017/0208011 A1* | 7/2017 | Bosch | H04L 47/25 |
| 2017/0208037 A1* | 7/2017 | Hay | H04L 63/0245 |
| 2017/0230199 A1* | 8/2017 | Shen | H04L 12/4641 |
| 2017/0244631 A1* | 8/2017 | Guichard | H04L 45/50 |
| 2017/0251065 A1* | 8/2017 | Furr | H04L 67/16 |
| 2017/0257310 A1* | 9/2017 | Patil | H04L 45/64 |
| 2017/0289032 A1* | 10/2017 | Guichard | H04L 45/306 |
| 2017/0324714 A1* | 11/2017 | Wainner | H04L 63/0272 |
| 2017/0359265 A1* | 12/2017 | Bosch | H04L 47/2441 |
| 2017/0359758 A1* | 12/2017 | Chigurupati | H04L 12/14 |
| 2017/0373990 A1* | 12/2017 | Jeuk | H04L 45/306 |
| 2018/0041420 A1* | 2/2018 | Saad | H04L 45/22 |
| 2018/0062984 A1 | 3/2018 | Hill et al. | |
| 2018/0227221 A1* | 8/2018 | Starsinic | H04L 41/0893 |
| 2018/0375755 A1* | 12/2018 | Joshi | H04L 45/18 |
| 2020/0036629 A1* | 1/2020 | Roeland | H04W 28/0273 |

FOREIGN PATENT DOCUMENTS

| | | |
|---|---|---|
| EP | 1478129 A3 | 3/2007 |
| EP | 3288226 A1 | 2/2018 |

OTHER PUBLICATIONS

Beker, "European Search Report for European Patent Application No. 17183706.5;", dated Jan. 12, 2018, 13 pages.

Homma, et al., "Analysis on Forwarding Methods for Service Chaining; draft-homma-sfc-forwarding-methods-analysis-04.txt" Internet Engineering Task Force, IETF, Internet Society (ISOC) 4, Geneva, Switzerland, Oct. 10, 2015 (Oct. 10, 2015), pp. 1-34, XP015108837, 34 pages.

Oh, "Office Action issued in U.S. Appl. No. 15/249,260, filed Aug. 26, 2016", dated Mar. 22, 2018.

Quinn, et al., "Network Service Header", Jan. 22, 2015. < https://www.ietf.org/archive/id/draft-quinn-sfc-nsh-05.txt>, 35 pages.

Quinn, "Service Function Chaining: Creating a Service Plane via Network Service Headers", Computer, IEEE Computer Society, USA, vol. 47, No. 11, Nov. 1, 2014 (Nov. 1, 2014), pp. 38-44, XP011564861.

\* cited by examiner

200

Format a protocol data unit (PDU) of a label switching network (LSN) to include a network service field specifying a network service to be applied to the PDU, wherein the PDU specifies routing and forwarding (R&F) of the PDU for a path in the LSN ending in another LSN enclave, and R&F between enclaves in a non-LSN, and wherein the network service field is positioned between the PDU data link layer and network layer of the non-LSN
210

Communicate the formatted PDU from the first enclave, via the non-LSN, to a second enclave of the LSN in accordance with the R&F between enclaves in the non-LSN
220

Determine, in the second enclave, from the network service field of the communicated PDU, each network service specified to be applied to the PDU
230

Apply, in the second enclave, each of the determined network services to the PDU
240

Transmit, from the second enclave, the network serviced PDU in accordance with the routing and forwarding information of the PDU in the label switching network.
250

Format a generic routing encapsulation (GRE) field of the IP network ahead of the network service header (NSH) field of the IP datagram network
312

Format a MultiProtocol Label Switching (MPLS) label of the label switching network (LSN) as a context header in the NSH field
314

Communicate the formatted PDU from the first enclave, via the non-LSN, to a second enclave of the LSN in accordance with the R&F between enclaves in the non-LSN
220

Format a generic routing encapsulation (GRE) field of the non-label switching network, including an MPLS label of the MPLS VPN, ahead of the NSH field
512

Communicate the formatted PDU from the first enclave, via the non-LSN, to a second enclave of the LSN in accordance with the R&F between enclaves in the non-LSN
220

FIG. 5

NETWORK SERVICES ACROSS NON-CONTIGUOUS SUBNETS OF A LABEL SWITCHED NETWORK SEPARATED BY A NON-LABEL SWITCHED NETWORK

CROSS-REFERENCE TO RELATED APPLICATIONS

This application is a continuation of and claims priority to U.S. patent application Ser. No. 15/249,260, filed Aug. 26, 2016, and entitled "Network Services Across Non-Contiguous Subnets of a Label Switched Network Separated by a Non-Label Switched Network." The entire contents of the above-identified priority application are hereby fully incorporated herein by reference.

TECHNICAL FIELD

The disclosed technology relates to providing network services across non-contiguous subnets of a label switched virtual private network. In particular, example embodiments relate to providing per tenant network services across enclaves of a Multiprotocol Label Switching (MPLS) network spanning an Internet Protocol (IP) network.

BACKGROUND

MPLS is a technology to direct digital data packets over computer networks based on path labels, rather than based on network addresses such as IP addresses. Each path label, also known as a "virtual private network" (VPN) label, identifies a path between network nodes, rather than only identifying the endpoints of the packet transmission. Routers of an MPLS network must be enabled to perform label switching to route and forward the packets. Such routers in the interior of an MPLS network are know as "label switch routers," while such routers at the ingress and egress points of the MPLS network are known as "label edge routers." Label edge routers discover and interface with non-MPLS networks outside the MPLS network using protocols such as Border Gateway Protocol (BGP). The outside networks can be provider networks, such as a national broadband provider IP networks, in which case the provider's routers are known as provider edge (PE) routers. The use of labels enables each MPLS router to maintain a separate routing and forwarding table instance, known as a virtual routing and forwarding (VRF) table or forwarding information base (FIB), for each of a plurality of tenants of the MPLS.

Generic Routing Encapsulation (GRE) is a point-to-point tunneling protocol in which two peer nodes form the endpoints of the tunnel. GRE is designed to encapsulate network-layer (L3) packets inside IP tunneling packets. Multipoint GRE (mGRE) is a similar protocol with a single endpoint at one side of the tunnel connected to multiple endpoints at the other side of the tunnel. An mGRE tunnel can provide a common link between branch offices that connect to the same VPN.

BRIEF DESCRIPTION OF THE DRAWINGS

FIG. 2 is a block flow diagram depicting a method to provide network services across non-contiguous subnets of a label switched virtual private network, in accordance with certain example embodiments.

FIG. 3 is a block flow diagram depicting a method to format a protocol data unit (PDU) of a label switching network to include a network service field specifying at least one network service to be applied to the PDU, in accordance with certain example embodiments.

FIG. 5 is a block flow diagram depicting a method to format a PDU of a label switching network to include a network service field specifying at least one network service to be applied to the PDU, in accordance with certain example embodiments.

DETAILED DESCRIPTION OF EXAMPLE EMBODIMENTS

Overview

Figure 1:
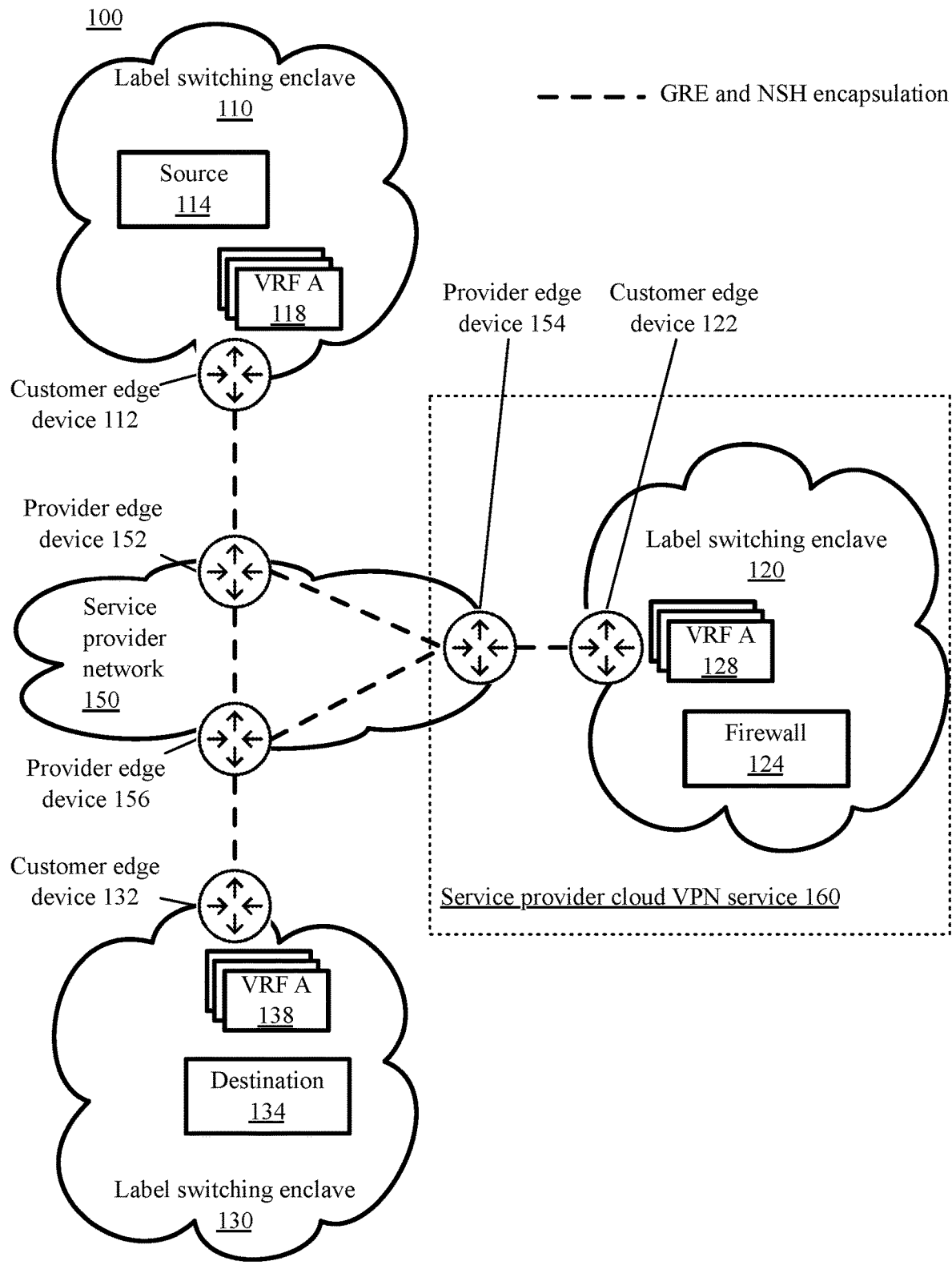
FIG. 1 is a block diagram depicting a communications and processing architecture to provide network services across non-contiguous subnets of a label switched virtual private network, in accordance with certain example embodiments.

Implementing an MPLS VPN over GRE or mGRE (MPLSoGRE) can overcome the requirement that all subnets participating in an MPLS network support MPLS. MPLSoGRE overcomes this requirement by allowing MPLS connectivity between non-contiguous MPLS subnets (hereinafter also referred to as MPLS "enclaves") that are connected by non-MPLS networks, such as IP networks. MPLSoGRE allows MPLS label switched paths (LSPs) to use GRE tunnels to cross non-MPLS routing areas, autonomous systems, and Internet service providers (ISPs). For this reason, MPLSoGRE is being deployed to build large-scale private MPLS VPN networks comprising non-contiguous subnets over public IP transport. The MPLSoGRE functionality offers customers the scale and functions of MPLS VPN label forwarding networks, while leveraging the simplicity of public IP transport. The Internet Engineering Task Force (IETF) Request For Comment (RFC) 4797 describes an implementation strategy for such a network.

However, neither IETF RFC 4797, nor any other known publication, describes implementations for transporting network services information or policy information across non-contiguous MPLS subnets separated by one or more non-MPLS networks using MPLSoGRE. For example, an MPLS network operator might want to apply a policy that packets originating from a source node in a first enclave of the MPLS network pass through a cloud-based firewall network service in a second enclave of the MPLS network before being transmitted to a destination in a third enclave of the MPLS network.

Embodiments herein provide computer-implemented methods, systems, and computer program products for applying service chaining (and in some cases, the propagation of other metadata such as security data) to MPLSoGRE networks encompassing multiple enclaves separated by a non-MPLS network.

In some embodiments, in a first enclave of a label switching network, network computing device(s), such as a label edge router, format a protocol data unit (PDU) of the label switching network to include a network service field. The network service field specifies at least one network service to be applied to the PDU. The PDU specifies routing and forwarding information of the PDU for a path in the label switching network ending in an enclave of the label switching network other than the first enclave, and routing and forwarding information between enclaves in a non-label switching network. The network service field is positioned between the PDU data link layer and network layer of the non-label switching network. The label edge router communicates the formatted PDU from the first enclave, via the non-label switching network, to a second enclave of the label switching network in accordance with the routing and forwarding information between enclaves in the non-label switching network.

In the second enclave of the label switching network, a receiving router such as a label edge router of the second enclave, determines each network service specified to be applied to the PDU in the second enclave from the network service field of the communicated PDU. Computing devices of the second enclave apply each of the determined network services to the PDU. Computing devices of the second enclave, for example, a second enclave edge router, transmit the network serviced PDU in accordance with the routing and forwarding information of the PDU in the label switching network.

By using and relying on the methods and systems described herein, the technology disclosed herein provides for service chaining across non-contiguous subnets of a label switched computer network. As such, the technologies described herein may be employed to implement per-tenant and non-static service chains while retaining the benefits of a label-switched network and the benefits of inter-subnet transport using pervasive broadband non-label switched networks. The technology described herein can be used to leverage the availability of cloud network services (which are typically isolated in a cloud subnet) to transport data between label switched subnets. Hence, users of such technology avoid, among other things, static one-size-fits-all application of network services, the duplication of identical network services in each subnet, and cumbersome routing and forwarding schemes to link data with network services.

These and other aspects, objects, features, and advantages of the example embodiments will become apparent to those having ordinary skill in the art upon consideration of the following detailed description of illustrated example embodiments.

Turning now to the drawings, in which like numerals represent like (but not necessarily identical) elements throughout the figures, example embodiments are described in detail.

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

FIG. 1 is a block diagram depicting a communications and processing architecture 100 to provide network services across non-contiguous subnets of a label switched virtual private network, in accordance with certain example embodiments. As depicted in FIG. 1, the architecture 100 includes label switching network enclaves 110, 120, and 130, along with service provider network 150 (a non-label switched network). In a continuing example, label switching enclaves 110 and 130 represent different physical subnets of a customer's non-contiguous MPLS network, while enclave 120 represents an MPLS enclave implemented by a service provider as a cloud service 160 for a customer. Each MPLS enclave 110, 120, and 130 includes at least one customer edge device—112, 122, and 132, respectively. Each customer edge device 112, 122, and 132 (and by extension, each enclave 110, 120, and 130) is associated with one or more VRF tables (for example, 118, 128, and 138, respectively) for allowing multiple concurrent instances of a routing table to exist within the device at the same time. In particular, each of enclaves 110, 120, and 130 include a copy of VRF A 118, 128, and 138, respectively. The service provider network 150, a non-label switched network, includes provider edge devices 152, 154, and 156 to communicate with customer edge devices 112, 122, and 132, respectively.

In the continuing example, each customer edge device 112, 122, and 132 is a label edge router implementing a version of the Border Gateway Protocol (BGP) to communicate with the corresponding service provider network 150 provider edge device (also implementing BGP). In some embodiments, other edge protocols, such as Exterior Gateway Protocol (EGP) can be used. Throughout this specification, "communicate" refers to the ability both to "transmit" and to "receive."

Each of label switching enclaves 110, 120, and 130, along with service provider network 150, includes one or more wired or wireless telecommunications systems including at least one label switched network such as an MPLS and generalized MPLS (which extends MPLS to manage further classes of interfaces and switching technologies other than packet interfaces and switching, such as time division multiplexing, layer-2 switching, wavelength switching and fiber-switching) by which network devices may exchange data in formats known as protocol data units (PDUs), packets, or frames. For example, the service provider network 150 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages.

Throughout the discussion of example embodiments, it should be understood that the terms "data" and "information" are used interchangeably herein to refer to text, images, audio, video, or any other form of information that can exist in a computer-based environment.

Each network device can include a communication subsystem capable of transmitting and receiving data over the network(s) it communicates with. For example, each network device can include a server, or a partition of a server, router virtual machine (VM) or container, a portion of a router, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, a user associated with a device must install an application and/or make a feature selection to obtain the benefits of the technology described herein.

The network connections illustrated are examples and other approaches for establishing a communications link between the computers and devices can be used. Additionally, those having ordinary skill in the art and having the benefit of this disclosure will appreciate that the network devices illustrated in FIG. 1 may have any of several other suitable computer system configurations, and may not include all the components described above.

Figure 7:
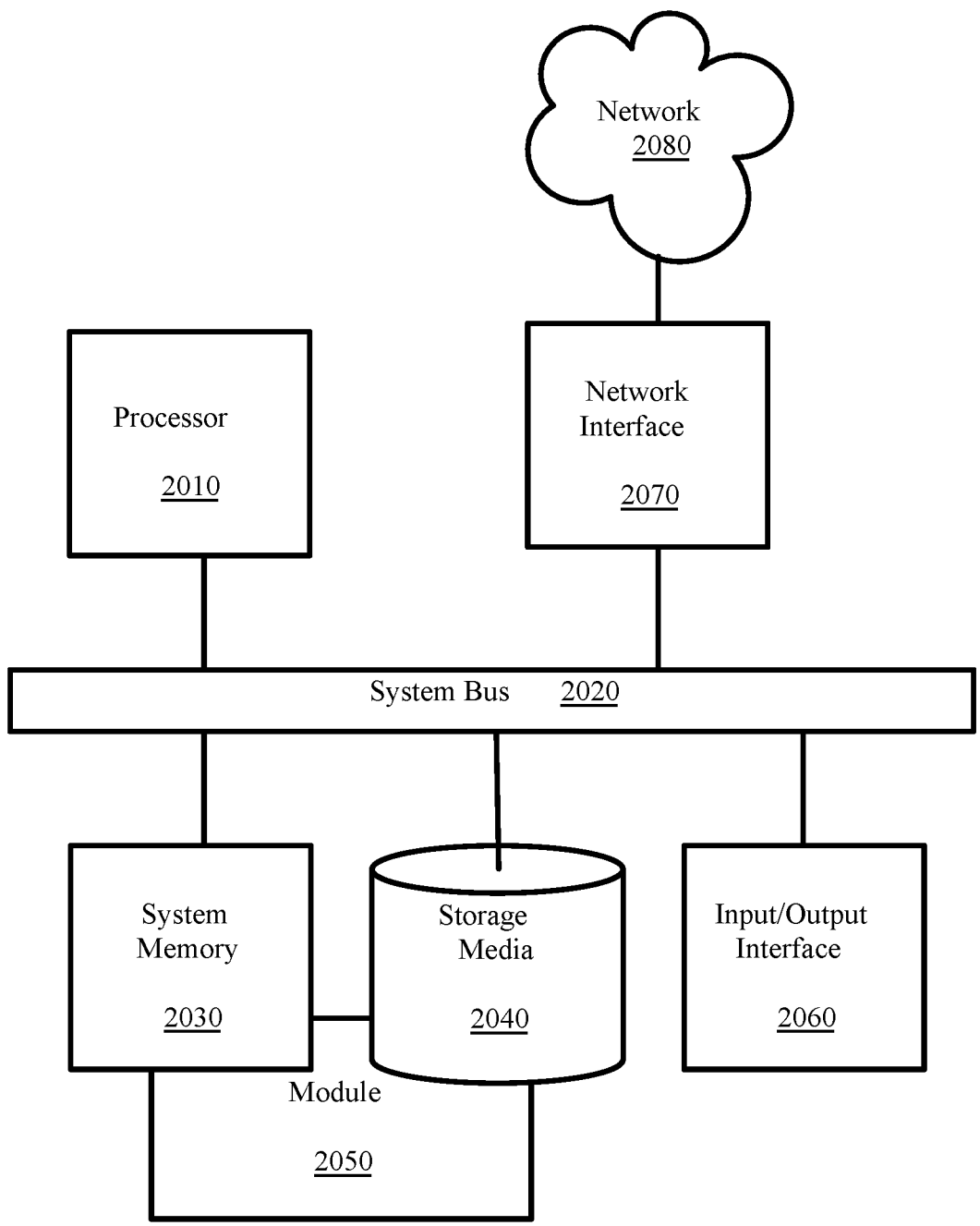
FIG. 7 is a diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 7. The computing machines discussed herein may communicate with one another, as well as with other computing machines or communication systems over one or more networks, such as network 110, 120, 130, and 150. Each network may include various types of data or communications network, including any of the network technology discussed with respect to FIG. 7.

EXAMPLE EMBODIMENTS

The example embodiments illustrated in the following figures are described hereinafter with respect to the components of the example operating environment and example architecture 100 described elsewhere herein. The example embodiments may also be practiced with other systems and in other environments. The operations described with respect to the example processes can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, a block flow diagram depicting a method 200 to provide network services across non-contiguous subnets of a label switched VPN is shown, in accordance with certain example embodiments. In such a method 200, in a first enclave of a label switching network (such as enclave 110), one or more computing devices (such as the CE router 112) formats a protocol data unit (PDU) of a label switching network to include a network service field specifying at least one network service to be applied to the PDU—Block 210. The computing device(s) formats the PDU to specify routing and forwarding information of the PDU for a path in the label switching network ending in an enclave of the label switching network other than the first enclave. The computing device(s) format the PDU to specify routing and forwarding information between enclaves in a non-label switching network. The network service field is positioned between the PDU data link layer and network layer of the non-label switching network.

In a continuing example, an MPLS network operator applies a policy that packets originating from a source node (for example source node 114) in the first enclave 110 of the MPLS network pass through a cloud-based firewall 124 in the second enclave 120 of the MPLS network, before being transmitted to a destination (for example, destination 134) in the third enclave 130 of the MPLS network. In such a case, customer edge (CE) router 112 in enclave 110 formats the PDU to include the provision of cloud firewall services 124. The CE router 112 also formats a label of the MPLS network to indicate a path to destination 134 in enclave 130 using a VPN label corresponding to the path from source 114, through firewall 124, and to destination 134, using the instance of VRF A 118 associated with customer edge device 112. In other examples, a network element of enclave 110 other than the CE router 112, for example a security policy routine executing on source 114, formats the PDU to specify that one or more services are to be applied to the PDU at certain points in the path.

Referring to FIG. 3, and continuing to refer to prior figures for context, a block flow diagram 300 depicting the operation of Block 210 is shown, in accordance with certain example embodiments (including the continuing example). In such methods, the second network is an Internet Protocol (IP) datagram network, and the network service field describes network service chaining using a network service header (NSH). NSH provides a service plane protocol for metadata exchange along a service path to specify services to be applied to a packet/frame/PDU. The services can include security functions (for example a firewall or an intrusion detection system), network acceleration and optimization, and server load balancing. Applying a sequence of services is known as "service chaining" or "service function chaining." Implementations of NSH are described in IETF draft-ietf-sfc-nsh-05 (current version as of the filing date of the present application).

Figure 4:
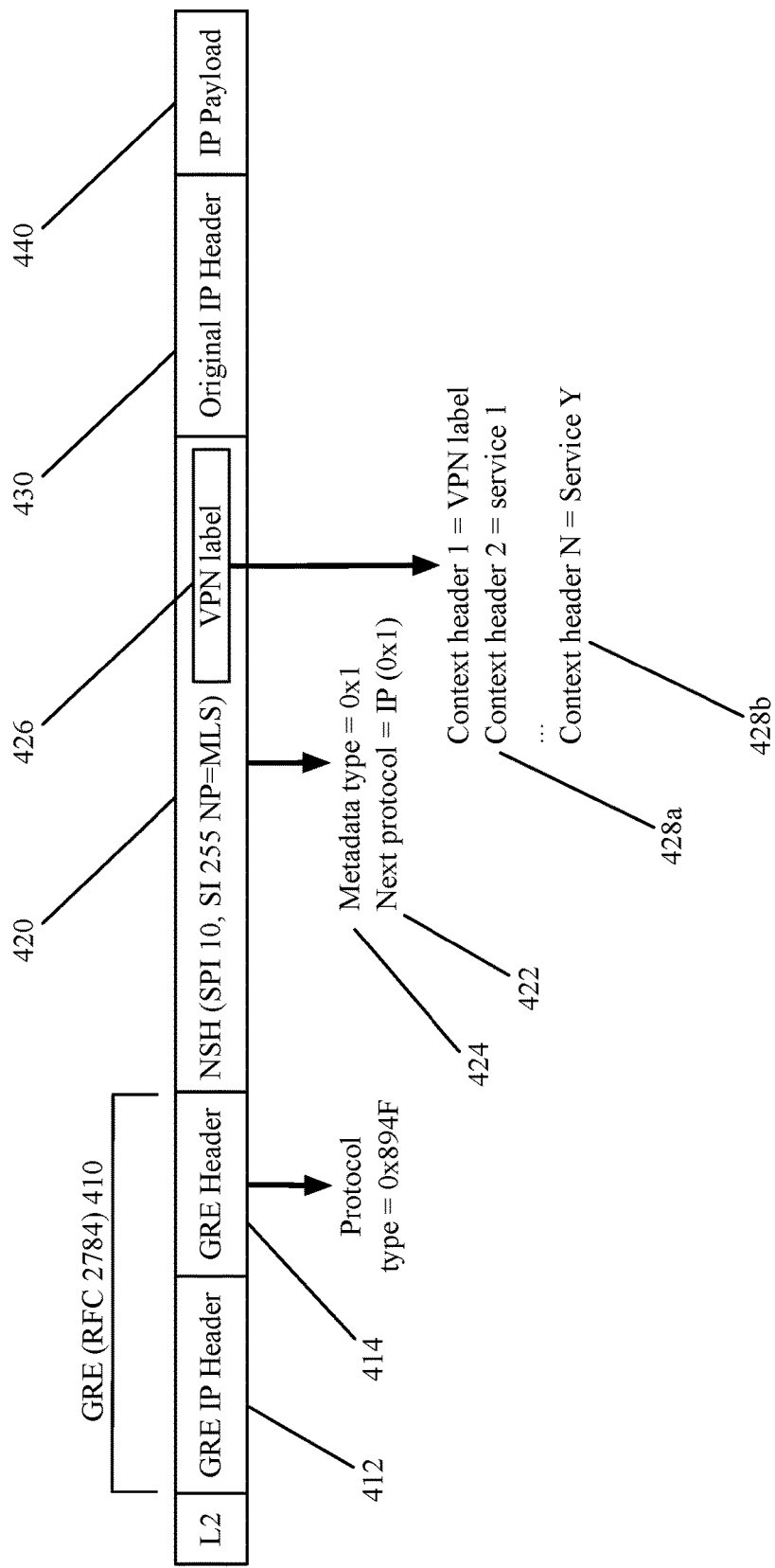
FIG. 4 is a portion of a PDU used to provide network services across non-contiguous subnets of a label switched virtual private network, in accordance with certain example embodiments.

In the continuing example, as part of the Block 210, the CE router 112 formats the PDU with a generic routing encapsulation (GRE) field of the service provider network 150 (an IP network) ahead of the network service header (NSH) field—Block 312. Referring to FIG. 4, a portion of a PDU 400 used to provide network services across non-contiguous subnets of a label switched virtual private network is shown, in accordance with example embodiments, including the continuing example. In the continuing example, the CE router 112 formats the GRE field 410 in accordance with IETF RFC 2784, including formatting a GRE IP Header 412 with the service provider network 150 IP address of provider edge router 154—the PE router providing access to the enclave hosting the service to be applied to the PDU. The CE router determines this address from the service information (a firewall of enclave 120 served by PE router 154 described below). CE router 112 learns of the IP address of provider edge router 154 via a border gateway protocol (BGP) operating between the service provider IP network 150 and each CE router of MPLS enclaves 110, 120, and 130. CE router 112 formats the GRE header 414 of the GRE field 410 to indicate that the encapsulated protocol is type 0x894F—corresponding to NSH. The CE router 112 places the GRE field 410 ahead of the NSH field 420 in the PDU.

In addition, as part of Block 210, the CE router 112 formats an MPLS label of the label switching network (LSN) as a context header in the NSH field—Block 314. In the continuing example, the CE router 112 formats the NSH field 420 per IETF draft-ietf-sfc-nsh-05 to specify a service path identifier (SPI), a service index (SI), a next protocol (NP), and at least two context headers (one context header for each service to be applied to the PDU, and one for the MPLS VPN path label for the path between the source 114 and the destination 134). In the continuing example shown in FIG. 4, the combination SPI/SI (10/255) corresponds to a transport layer of type GRE—as described above. The NP value shown in the body of field 420, "MLS," indicates that the context header 426, and not the following fields 430 and 440, will contain MPLS data in addition to containing service function chain (SFC) data. The NP value 422 (shown outside the body of field for clarity) 420 indicates that the fields 430 and 440 following the NSH field 420 are IPv4 protocol fields. The metadata type field 424 (0x1) (shown outside the body of field for clarity) 420 indicates that NSH 420 contains fixed length context headers. The first context header 426 carried by the NSH 420 is the MPLS VPN label for the path from the source 114 in the first enclave 110 to the destination 134 in the third enclave 130. The second context header 428a identifies the firewall service 124 of enclave 120 as the service to be applied—it is from this data that the CE router 112 formatted the GRE label 410. The NSH 420 can include additional fields for the application of additional services, for example context header N specifying service Y to be applied to the PDU after application of service 1 (the firewall 124). In the continuing example, only one service, the firewall 124, is applied to the PDU.

Returning to FIG. 2, and continuing to refer to FIG. 3 and FIG. 4 for context, the one or more computing devices (such as the CE router 112, PE router 152, service provider network 150, PE router 154, and CE router 122) communicate the formatted PDU from the first enclave, via the non-label switching network, to a second enclave of the label switching network, in accordance with the routing and forwarding information between enclaves in the non-label switching network—Block 220. In the continuing example, the CE router 112 transmits PDU 400 from enclave 110, via PE router 152 and service provider network 150, to the PE router 154 and CE router 122 in accordance with the routing and forwarding information contained in the GRE field 410. PE routers 152 and 154 do not examine the NSH fields—hence the NSH and MPLS data is said to be "encapsulated" by the GRE data and is said to be communicated over the service provider network 150 through a GRE "tunnel" between PE router 152 and PE router 154. The static BGP routing between the CE router 112 and PE router 152, and then PE router 154 and the CE router 122, ensures that the PDU is forwarded to the CE router 122. Before forwarding the PDU to the CE router 122, the PE router 154 strips the GRE data from the PDU, leaving the NSH 420 as the next field to be processed. The CE router 122 receives the PDU minus the GRE field applied by CE router 112.

In the second enclave of the label switching network, the one or more computing devices (such as CE router 122), determines, from the network service field of the communicated PDU, each network service specified to be applied to the PDU—Block 230. In the continuing example, in enclave 120, CE router 122 determines, from NSH 420 internal next protocol (NP) value that the first context header 426 "MLS" will contain MPLS data in addition to containing service function chain (SFC) data. The first context header 426 carried by the NSH 420 is the MPLS VPN label 426 for the path from the source 114 to the destination 134. The CE router 122 examines the second context header 428a to determine that the service to be applied to the PDU, before routing the PDU on the path indicated in the VPN label 426, is the firewall service 124.

The computing device(s) applies, in the second enclave, each of the determined network services to the PDU—Block 240. In the continuing example, the CE router 122 of the second enclave 120 forwards the PDU, now stripped of the GRE header applied by the CE router 112 of the first enclave 110, to the firewall 124 for network service processing. While the specific operation of the firewall 124 is outside the scope of this application, firewall 124 may use several strategies to control traffic flowing in the MPLS network, including analyzing PDU/packet contents for features such as paths and addresses, comparing packet meta-characteristics to profiles of allowed and prohibited packets. In some embodiments, firewall 124 is integrated in to CE router 112. In some embodiments, the CE router forwards the PDU to a router closer to the firewall 124. In the continuing example, the firewall examines the VPN label 126, and determines that the PDU is allowed to pass to destination 134 from source 114 because the VPN label is on a whitelist of labels in the MPLS. Such information is propagated between network services by technologies known to those of skill in the relevant art, and is outside the scope of this application. In other embodiments, network services such as intrusion prevention, or load balancing are applied to the PDU based upon the service specified in the context field of the NSH 420. For some such services, higher-level protocol data of the PDU, such as transport, session, presentation, and application data can be examined as part of applying the network service.

Upon completion of the network services specified to be applied in the receiving enclave, the PDU is transmitted in accordance with the label switched network routing and forwarding information of the PDU—Block 250. In the continuing example, the Firewall 124 is an NSH-aware service, and upon completion of the service strips the firewall NSH context field 428a from the NSH field 420, and returns the PDU to the CE router 122 of the second enclave 120 for determination of the next step in the communication of the PDU from the source 124 to the destination 134. In other embodiments, the second enclave router nearest the firewall 124, for example a label switch router of the enclave, strips the firewall NSH context field from the PDU and determines the path from the VPN label. In the continuing example, CE router 122 of the second enclave 120 examines the context headers of the NSH field 420, and determines 1) that there are no more services to be applied to the PDU, and 2) that the VPN label indicates a path to a destination in enclave 130. In some embodiments, a service audit trail is maintained by not stripping the context header of a completed service, but indicating in the context header that the service has been completed. For example, the service sets a "completed" flag in the corresponding context header.

In the continuing example, similar to Block 210, CE router 122, through examination of the VPN label in PDU 400 showing a path to destination 134 in enclave 130, and through CE router's participation in the MPLS network and the IP network (through BGP), determines that the PDU must be routed to enclave 130 via a GRE tunnel from PE router 154 to PE router 156. The CE router 122 of the second enclave 120, then adds a new GRE label, in the same fashion as described above with regard to Blocks 210, 412, and 414, to the PDU for transport of the PDU from the second enclave 120 to the third enclave 130. At the third enclave, CE router 132 received a PDU stripped of the newly added GRE field, examines the NSH field 420. Since the NSH field 320 either contains no context fields requiring the application of network services, or contains an indication that network services have been applied to the PDU, forwards the PDU to its destination per the MPLS VPN label 426 contained in the NSH field 420.

In other embodiments, MPLS VPN labels can be stacked. For example, a first enclave 110 router can apply a stack of MPLS VPN labels, such a VPN label 426, to the NSH field 420 of a packet intended for a destination in a third enclave 130 via a second enclave 120 where services, such as firewall 124, specified in the NSH 460 are to be applied. When the end of the path of the topmost label in the stack is reached, the node directing the PDU reads the next label in the stack and acts on the packet as described above.

Referring to FIG. 5, and continuing to refer to prior figures for context, a block flow diagram 500 depicting the operation of Block 210 is shown, in accordance with certain example embodiments (including a second example). In such methods, the second network is an Internet Protocol (IP) datagram network, and the network service field describes network service chaining using a network service header (NSH).

In the second example, as in the first example, an MPLS network operator applies a policy that packets originating from a source node (for example source node 114) in the first enclave 110 of the MPLS network pass through a cloud-based firewall 124 in the second enclave 120 of the MPLS network, before being transmitted to a destination (for example, destination 134) in the third enclave 130 of the MPLS network. In such a case, customer edge (CE) router 112 in enclave 110 formats the PDU to include the provision of cloud firewall services 124. The CE router 112 also formats a label of the MPLS network to indicate a path to destination 134 in enclave 130 using a VPN label corresponding to the path from source 114, through firewall 124, and to destination 134, using the instance of VRF A 118 associated with customer edge device 112.

Figure 6:
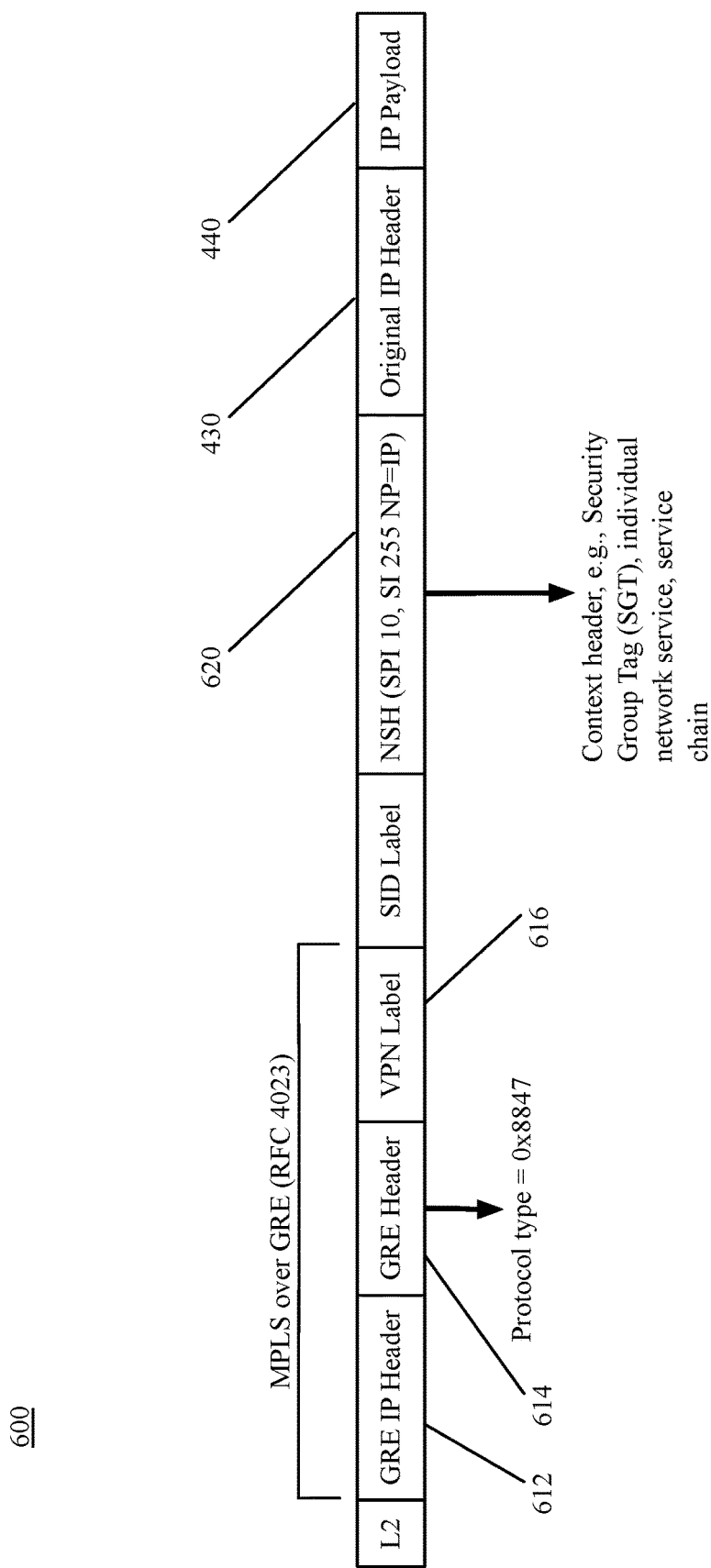
FIG. 6 is a portion of a PDU used to provide network services across non-contiguous subnets of a label switched virtual private network, in accordance with certain example embodiments.

In the second example, as part of the Block 210, the CE router 112 formats the PDU with a generic routing encapsulation (GRE) field of the service provider network 150 (an IP network) ahead of the network service header (NSH) field—Block 512. Referring to FIG. 6, a portion of a PDU 600 used to provide network services across non-contiguous subnets of a label switched virtual private network is shown, in accordance with example embodiments, including the second example. In the second example, the CE router 112 formats the GRE field 610 in accordance with IETF RFC 4023, including formatting a GRE IP Header 612 with the service provider network 150 IP address of provider edge router 154—the PE router providing access to the enclave hosting the service to be applied to the PDU. The CE router determines this address from the service information (a firewall of enclave 120 served by PE router 154 described below). CE router 112 learns of the IP address of provider edge router 154 via a border gateway protocol (BGP) operating between the service provider IP network 150 and each CE router of MPLS enclaves 110, 120, and 130. CE router 112 formats the GRE header 614 of the GRE field 410 to indicate that the encapsulated protocol is type 0x8847—corresponding to a multicast frame, the GRE field 410, carrying the MPLS VPN label. CE router 112 formats an MPLS VPN label 616 of the label switching network within the GRE field 610 for the path between the source 114 and the destination 134. The CE router 112 places the GRE field 410 ahead of the NSH field 420 in the PDU.

In addition, as part of Block 512, the CE router 112 formats the NSH field 620 as described in connection with FIG. 3 and FIG. 4 above. The technology of the second example then proceeds with Blocks 220-250 as described above, except that the VPN label 616 in the second embodiment is examined by the receiving router, CE router 122 in the case of the second example, before determining the services specified in the NSH 620, and then re-inserted by CE router 122 into the next GRE header for the non-MPLS segment of the path from PE router 154 to PE router 156.

OTHER EXAMPLE EMBODIMENTS

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A computer-implemented method, comprising:
   in a first enclave of a label switching network:
      formatting, by one or more first enclave computing devices, a protocol data unit (PDU) of the label switching network to include a network service field specifying at least one network service to be applied to the PDU and to include a label of the label switching network as a context header in the network service field, wherein the PDU specifies routing and forwarding information of the PDU for a path in the label switching network ending in an enclave of the label switching network other than the first enclave, and routing and forwarding information between enclaves in a non-label switching network; and
      communicating, by the one or more first enclave computing devices, the formatted PDU from the first enclave, via the non-label switching network, to a second enclave of the label switching network in accordance with the routing and forwarding information between enclaves in the non-label switching network; and
   in the second enclave of the label switching network:
      determining, by one or more second enclave computing devices, from the network service field of the communicated PDU, each network service specified to be applied to the PDU in the second enclave;
      applying, by the one or more second enclave computing devices, each of the determined network services to the PDU; and
      transmitting, by the one or more second enclave computing devices, the network-serviced PDU in accordance with the routing and forwarding information of the PDU in the label switching network.

2. The method of claim 1, wherein the non-label switching network is an Internet Protocol (IP) network, and wherein the network service field describes network service chaining.

3. The method of claim 2, wherein the label switching network is a MultiProtocol Label Switching (MPLS) network, and wherein the network service field is formatted as a network service header (NSH).

4. The method of claim 3, wherein formatting comprises formatting a generic routing encapsulation (GRE) field of the non-label switching network ahead of the NSH field.

5. The method of claim 3, wherein formatting comprises formatting a generic routing encapsulation (GRE) field of the non-label switching network, including an MPLS label of the MPLS network, ahead of the NSH field.

6. The method of claim 1, wherein the at least one network service comprises at least one of a firewall, a load balancer, an intrusion prevention system, and a traffic analyzer.

7. The method of claim 1, wherein the network service field is positioned between a PDU data link layer and network layer of the non-label switching network.

8. A computer program product, comprising:
   a non-transitory computer-readable storage device having computer-executable program instructions embodied thereon that when executed by a computer cause the computer to apply packet-level network services across enclaves of a label switched network separated by a non-label switched network, the computer-executable program instructions comprising:
      computer-executable program instructions to format, in a first enclave of a label switching network, a protocol data unit (PDU) of the label switching network to include a network service field specifying at least one network service to be applied to the PDU and to include a label of the label switching network as a context header in the network service field, wherein the PDU specifies routing and forwarding information of the PDU for a path in the label switching network ending in an enclave of the label switching network other than the first enclave, and routing and forwarding information between enclaves in a non-label switching network; and
      computer-executable program instructions to communicate the formatted PDU from the first enclave, via the non-label switching network, to a second enclave of the label switching network in accordance with the routing and forwarding information between enclaves in the non-label switching network;
   in the second enclave of the label switching network:
      computer-executable program instructions to determine from the network service field of the communicated PDU, each network service specified to be applied to the PDU;
      computer-executable program instructions to apply each of the determined network services to the PDU; and
      computer-executable program instructions to transmit the network serviced PDU in accordance with the routing and forwarding information of the PDU in the label switching network.

9. The computer program product of claim 8, wherein the non-label switching network is an Internet Protocol (IP) datagram network, and the network service field describes network service chaining.

10. The computer program product of claim 9, wherein the label switching network is a MultiProtocol Label Switching (MPLS) network, and the network service field is formatted as a network service header (NSH).

11. The computer program product of claim 10, wherein formatting comprises formatting a generic routing encapsulation (GRE) field of the non-label switching network ahead of the NSH field; and formatting an MPLS label of the MPLS network as a context header in the NSH field.

12. The computer program product of claim 10, wherein formatting comprises formatting a generic routing encapsulation (GRE) field of the non-label switching network.

13. The computer program product of claim 8, wherein the at least one network service comprises at least one of a firewall, a load balancer, an intrusion prevention system, and a traffic analyzer.

14. The computer program product of claim 8, wherein the network service field is positioned between a PDU data link layer and network layer of the non-label switching network.

15. A system, comprising:
one or more network devices of a first enclave of a label switching network, the one or more network devices of the first enclave comprising memory and one or more processor communicatively coupled to the memory, wherein the one or more processors execute instructions that are stored in the memory to cause the one or more network devices of the first enclave to:
format a protocol data unit (PDU) of the label switching network to include a network service field specifying at least one network service to be applied to the PDU and to include a label of the label switching network as a context header in the network service field, wherein the PDU specifies routing and forwarding information of the PDU for a path in the label switching network ending in an enclave of the label switching network other than the first enclave, and routing and forwarding information between enclaves in a non-label switching network; and
communicate the formatted PDU from the first enclave, via the non-label switching network, to a second enclave of the label switching network in accordance with the routing and forwarding information between enclaves in the non-label switching network; and
one or more network devices of the second enclave of the label switching network, the one or more network devices of the second enclave comprising memory and one or more processors communicatively coupled to the memory, wherein the one or more processors execute instructions that are stored in the memory to cause the one or more network devices of the second enclave to:
determine from the network service field of the communicated PDU, each network service specified to be applied to the PDU;
apply each of the determined network services to the PDU; and
transmit the network serviced PDU in accordance with the routing and forwarding information of the PDU in the label switching network.

16. The system of claim 15, wherein the non-label switching network is an Internet Protocol (IP) datagram network, and the network service field describes network service chaining.

17. The system of claim 16, wherein the label switching network is a MultiProtocol Label Switching (MPLS) network, and the network service field is formatted as a network service header (NSH).

18. The system of claim 17, wherein formatting comprises formatting a generic routing encapsulation (GRE) field of the non-label switching network ahead of the NSH field.

19. The system of claim 17, wherein formatting comprises formatting a generic routing encapsulation (GRE) field of the non-label switching network, including an MPLS label of the MPLS network, ahead of the NSH field.

20. The system of claim 15, wherein the at least one network service comprises at least one of a firewall, a load balancer, an intrusion prevention system, and a traffic analyzer.

* * * * *